July 29, 1952 R. C. CHEEK 2,605,397
RADIO RECEIVER FOR SINGLE SIDE BAND SIGNALS
Filed Feb. 25, 1950
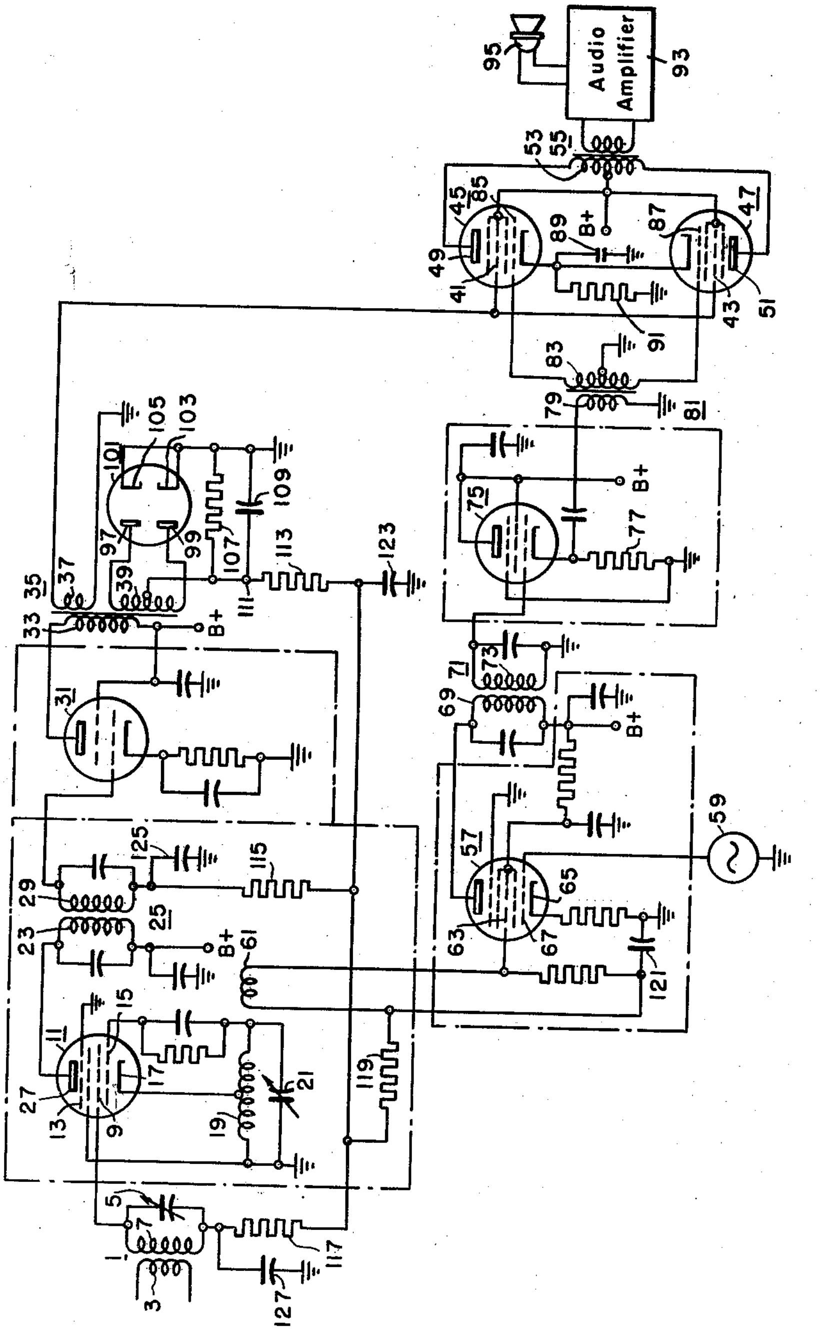
WITNESSES:
INVENTOR
Robert C. Cheek.
BY
ATTORNEY Patented July 29, 1952

2,605,397

UNITED STATES PATENT OFFICE 2,605,397

RADIO RECEIVER FOR SINGLE SIDE BAND SIGNALS

Robert C. Cheek, Irwin, Pa., assignor to Westinghouse Electric Corporation, East Pittsburgh, Pa., a corporation of Pennsylvania Application February 25, 1950, Serial No. 146,316

3 Claims. (Cl. 250—20)

My invention relates to communication apparatus and it has particular relation to carrier communication systems of the single-sideband type.

In the application Serial No. 707,478, filed November 2, 1946, now Patent No. 2,571,957, granted October 16, 1951, to John B. Singel and assigned to Westinghouse Electric Corporation, a system is disclosed on which my invention is based. This system includes a receiver for a single-sideband communication set which is of the superheterodyne type and has a balanced demodulator. The response of this demodulator is proportional substantially to the square of the signal impressed in its input. In operation the output of the intermediate frequency amplifier and carrier oscillations of intermediate frequency derived from a local oscillation generator are impressed in the input circuit of the demodulator. These combine to produce the audio signal. Automatic volume control is achieved in a system such as Singel's by impressing a potential dependent on the input signal in the grid circuits of the radio frequency and intermediate frequency amplifier tubes.

For many purposes Singel's system proves entirely adequate. There are, however, situations in which it is desirable that the automatic volume control be effective over a wider range of input signals, that is, in certain situations it is desirable that an output signal of relatively constant strength be produced in the translating device of the receiver for input signals which vary in strength from very weak to very strong magnitudes.

It is, accordingly, an object of my invention to provide a receiver for operation in a single-sideband communication system which shall include an automatic volume control effective over a wide range of input signals.

Another object of my invention is to provide a single-sideband receiver which shall produce a substantially uniform response at the translating device for input signals that vary from very weak magnitudes to very strong magnitudes.

A more general object of my invention is to provide a receiver having an automatic volume control circuit effective over a wide range of input signal amplitudes.

An ancillary object of my invention is to provide a novel mixing circuit having particular utility for use in radio receivers.

My invention arises from the realization that the strength of the signal which is derived from a demodulator such as that included in Singel's system varies not only with the amplitude of the input signal, but also with the amplitude of the signal derived from the local oscillation generator included in the receiver. The validity of this concept can be established by considering the mathematical relationships between the parameters involved in a system such as Singel's.

Let

A be the amplitude, and $v$ the frequency of the locally generated intermediate carrier signals;

B the amplitude, and $v+\omega_1$ the frequency of one of the incoming signals;

C the amplitude, and $v+\omega_2$ the frequency of a second incoming signal.

The input signals and the locally generated signals are impressed upon the input circuit of the demodulator. The envelope of the total signal impressed is equal to the resultant of the three signals, expressed as vectors, which resultant may be designated E. If the demodulator produces a response proportional to the square of the envelope of the input signal, then the relationship between the response and the signals impressed on the demodulator is given by $$E^2=A^2+B^2+C^2+2AB\cos\omega_1t+2AC\cos\omega_2t+2BC\cos(\omega_1-\omega_2)t$$

Singel's receiver has a demodulator which includes a pair of multigrid tubes connected in push-pull. A signal dependent on the received signal is impressed in phase on corresponding grids of each of the tubes. The locally generated signal is impressed in opposite phase on other corresponding grids of each of the tubes. The anodes of the tubes are connected through opposite windings of the primary of an output transformer to the center tap of the primary. As applied to the Singel system then, the quantity A in the above equation is at any time positive for one tube and negative for the other, while the quantities B and C are of the same sign and may be taken as positive. The output of the demodulator is the difference between $E^2$ for one tube and $E^2$ for the other. This difference is manifestly equal to $$D=4AB\cos\omega_1t+4AC\cos\omega_2t$$

Since A appears as a coefficient in both terms, the output of the demodulator is dependent on A and may be varied as A varies.

In accordance with my invention, I provide a system in which the locally generated signal injected in the balanced demodulator is varied in accordance with the automatic volume control potential which in itself is dependent on the magnitude of the input signal.

My invention in its specific aspects is described here particularly as applicable to a single-sideband receiver. In its broader aspects, my invention is applicable to radio receivers of other types which include local oscillators. For example, my invention can be applied with advantage to an ordinary superheterodyne receiver. It can also be applied with advantage to a superregenerative receiver. Such applications of my invention are within the broader aspects thereof.

The novel features that I consider characteristic of my invention are set forth with particularity in the appended claims. My invention itself, however, both as to its organization and its method of operation together with additional objects and advantages thereof, will be understood from the following description of a specific embodiment, when read in connection with the accompanying drawing, in which the single figure is a circuit diagram with a receiver in accordance with my invention.

The apparatus shown in the drawing includes an input transformer 1 on the primary 3 of which the signal to be received is impressed. The primary of this transformer may be connected to an antenna, or may be coupled to a power line of a power line carrier system through the usual coupling devices. The secondary circuit of the transformer 1 includes a capacitor 5 which is tuned in the usual manner to provide resonance with the secondary coil 7 for maximum reception at the desired frequency.

The output of the tuned secondary 7 is impressed on one of the grids 9 of a tube 11 which is connected in oscillation generator and converter circuits. The oscillation generator is of the Hartley type and includes two other grids 13 and 15 of the tube 11 and the cathode 17, an inductance 19 and a variable capacitor 21. An intermediate tap of the inductance is connected to the cathode 17 of the tube and its terminals are connected between the two grids 13 and 15. A converted signal is derived in the primary 23 of an IF transformer 25 connected between the positive terminal of a plate supply and the anode 27.

My invention may be with advantage widely applied to single-sideband carrier communication systems of the power line or beamed type. Let us assume, for example, that a system such as is disclosed in the drawing is used in a power line carrier communication system. In such a system the input signal may have a frequency of the order of 100 kilocycles plus the modulation frequencies. The local oscillator in such a system can conveniently generate a signal of relatively constant frequency of the order of 360 kilocycles. For such purpose I have found that the oscillator and converter tube may be a pentagrid converter such as a 6SA7. The signal derived from the converter may then have an intermediate frequency of the order of 260 kilocycles.

This signal is impressed through the secondary 29 of the I. F. transformer 25 in the input circuit of the intermediate amplifier 31. The output of this amplifier is impressed on the primary 33 of a transformer 35 having a pair of secondary windings 37 and 39 respectively. One of the secondary windings 37 is connected directly to each of the grids 41 and 43 respectively of a pair of tubes 45 and 47 connected in a demodulator circuit. Each of the tubes 45 and 47 of the demodulator may be pentagrid converters, preferably 6SA7's. The anodes 49 and 51 respectively, of the tubes are connected to the terminals of the primary 53 of an output transformer 55. The intermediate tap of this primary is connected to the positive terminal of the plate supply. The input signal derived from the I. F. amplifier 31 is customarily connected to the third grids (41 and 43) of each of the tubes.

A carrier signal of the intermediate frequency is also impressed in an input circuit of the demodulator (43 and 45). This signal is derived from a mixer 57, preferably a pentagrid converter, for example a 6SA7, in the input circuits of which signals derived from the local oscillator (11, 19, 21) and from a stable generator 59 operating at the received carrier frequency (in the example under consideration, 100 kilocycles) are impressed. The local oscillator signal is derived from a coil 61 coupled to the inductance 19 and is impressed between the third grid 63 and the cathode 65, of the mixer 57. The output of stable generator 59 is impressed on the first grid 67 of the tube 57. A signal having the intermediate frequency, the difference between the local oscillator frequency and the carrier generator frequency, is derived from the output of the mixer tube 57 through the primary 69 of an intermediate frequency transformer 71. In the example under consideration this intermediate frequency is 260 kilocycles.

The intermediate frequency derived from the mixer 57 varies in dependence upon the variations of the output frequency of the local oscillator (11, 19, 21). However, the intermediate frequency signal impressed on the intermediate frequency amplifier 31 varies correspondingly. The two variations counteract so that the effect of variation in the frequency of the local oscillator (11, 19, 21) is compensated.

The secondary 73 of the intermediate frequency transformer 71 is connected in the input circuit of a second intermediate frequency amplifier 75. This amplifier is connected as a cathode follower, and its output resistor 77 is coupled to the primary 79 of a transformer 81 in the input circuit of the demodulator (43, 45). The secondary 83 of the transformer 81 is provided with a grounded intermediate tap. The terminals of this secondary are connected each to a first grid 85 and 87 respectively of a corresponding modulator tube 43 and 45. A signal of the carrier intermediate frequency is thus impressed in input circuits of the modulator tubes 43 and 45 in opposite phase.

As taught by Singel, the impedances of the components 37, 53, 83 and 91 in the demodulator circuit and the voltages in this circuit are such that the demodulator functions to mix the signals impressed in the input circuits of the tubes and produce an output signal proportional to the difference of the squares of the mixed signal impressed on each tube. The output of the demodulator is impressed in the input circuit of an audio amplifier 93 which supplies a translating device 95 such as earphones, coding relays or a cathode ray tube.

The terminals of the other secondary of the output transformer 35 are connected to the anodes 97 and 99 of a double diode 101, such as a 6H6 for example. The cathodes 103 and 105 of the double diode are connected together, and a parallel network of a resistor 107 and a capacitor 109 are connected between the center tap of the secondary 39 and the cathodes 103 and 105. The network (107, 109) functions as a source which provides a potential dependent on the magnitude of the received signal for automatic volume control purposes. The negative terminal 111 of this source is connected through by-passed resistors 113 and 115 and 117 to the input circuit of the intermediate frequency amplifier 31 and to the grid 9 of the input oscillator and converter 11 on which the incoming signal is impressed. The potential derived from the network (107, 109) thus tends to counteract the variation in amplitude of the received signal and to maintain the signal impressed on the third grids 41 and 43 of the demodulator tubes 43 and 45 relatively uniform.

While this volume control effect is satisfactory for many purposes, there are situations in which very strong or very weak signals beyond the range over which this volume control is effective are received. A very strong signal outside of the effective range of the volume control may cause the demodulator to overload and to produce a distorted response in the translating device 95. A weak signal beyond the range of the volume control may be inaudible or not visible in the case of video. In such situations it is desirable that the volume control be effective over a wider range than that available in the system as thus far disclosed.

To widen the effective range of the automatic volume control, the output of the automatic volume control source (107, 109) is impressed through a resistor 119 and the secondary coil 61 of the local oscillator (11, 19 and 21) on the third grid 63 of the mixer tube 57. This automatic volume control potential, like the others impressed, is by-passed to ground through a capacitor 121.

For a system operating in the 100 kilocycle, carrier, 260 kilocycle I. F. range the resistor 119 and the other resistors 113, 115 and 117 should have a resistance of the order of 500,000 ohms and the by-pass capacitor 121 and the other by-pass capacitors 123, 125 and 127 one tenth microfarads.

The tube 57 has a variable mu characteristic dependent on the potential impressed on its third grid 63. The potential impressed in my system is derived from the negative terminal 111 of the automatic volume control source (107, 109) and has the effect of decreasing the conversion transductance of the tube 57. The amplitude of the output of the mixer tube, that is the amplitude of the signal of frequency of 260 kilocycles, is thus reduced in accordance with the automatic volume control potential. The effect of this reduction is to extend the range of the automatic volume control.

While I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. A single-sideband receiver comprising means for deriving a potential having a magnitude which varies as a function of a received single-sideband signal, means for generating a signal of carrier frequency, a demodulator responsive substantially to the square of the magnitude of the signals impressed thereon, and comprising a pair of tubes each having a cathode, an anode, and a pair of grid electrodes, means for coupling said single-sideband signal in parallel relation between the cathodes of said tubes and corresponding grids thereof, means utilizing said potential to cause the magnitude of said carrier signal to vary in accordance with said potential, means for coupling said carrier signal between the other grid of one of said tubes and the corresponding grid of the other of said tubes, and an untuned output circuit coupled between the anodes of said tubes.

2. The combination comprising a source of single-sideband signals, a generator for generating signals of carrier frequency, means connected to derive a potential which varies in magnitude in accordance with variations in magnitude of the single-sideband signals, a mixer tube having an anode, a cathode, and a plurality of grid electrodes, means for applying said potential to one of the grid electrodes of said mixer tube, means for applying signals of carrier frequency to another of the grid electrodes of said mixer tube, said mixer tube being of nature such that said potential effects the mixer tube conversion transconductance, a demodulator responsive substantially to the square of the magnitude of the signals impressed thereon, and comprising a pair of tubes each having a cathode, an anode, and a pair of grid electrodes, means for coupling said single-sideband signals in parallel relation between the cathodes of said tubes and corresponding grids thereof, means for coupling the output of said mixer tube between the other grid of one of said tubes and the corresponding grid of the other of said tubes, and an untuned output circuit coupled between the anodes of said tubes.

3. A single-sideband receiver comprising means for producing a first local signal having a first predetermined frequency, means for mixing said signal with a received signal to produce a second signal, means for deriving a potential the magnitude of which varies in accordance with variations in magnitude of the received signal, means for producing a second local signal, means for mixing said first and second local signals and said potential to produce a third signal the magnitude of which varies in accordance with said potential, a demodulator responsive substantially to the square of the magnitude of signals impressed thereon, and comprising a pair of tubes each having a cathode, an anode, and a pair of grid electrodes, means for coupling said second signal in parallel relation between the cathodes of said tubes and corresponding grids thereof, means for coupling said third signal between the other grid of one of said tubes and the corresponding grid of the other of said tubes, and an untuned output circuit coupled between the anodes of said tubes.

ROBERT C. CHEEK.

REFERENCES CITED

The following references are of record in the file of this patent:

UNITED STATES PATENTS

| Number | Name | Date |
|---|---|---|
| 2,189,897 | Gutzmann et al. | Feb. 13, 1940 |
| 2,214,929 | Koschmieder | Sept. 17, 1940 |
| 2,231,368 | Mountjoy | Feb. 11, 1941 |
| 2,236,497 | Beers | Apr. 1, 1941 |
| 2,304,977 | Weagant | Dec. 15, 1942 |
| 2,462,224 | Rheams | Feb. 22, 1949 |